Aug. 3, 1965 R. BENSON ETAL 3,198,982

FLUORESCENT LIGHT REVERSING CIRCUIT FOR FACSIMILE TRANSMITTERS

Filed Jan. 13, 1961 2 Sheets-Sheet 1

INVENTORS

Robert Benson

Ansis Zilgalvis

By William J. Newman

Attorney

INVENTORS
Robert Benson
Ansis Zilgalvis
By William J. Newman
Attorney 3,198,982

FLUORESCENT LIGHT REVERSING CIRCUIT FOR FACSIMILE TRANSMITTERS

Robert Benson, Chicago, Ill., and Ansis Zilgalvis, Los Angeles, Calif., assignors to Stewart-Warner Corporation, Chicago, Ill., a corporation of Virginia Filed Jan. 13, 1961, Ser. No. 82,568
5 Claims. (Cl. 315—97)

Figure 1:
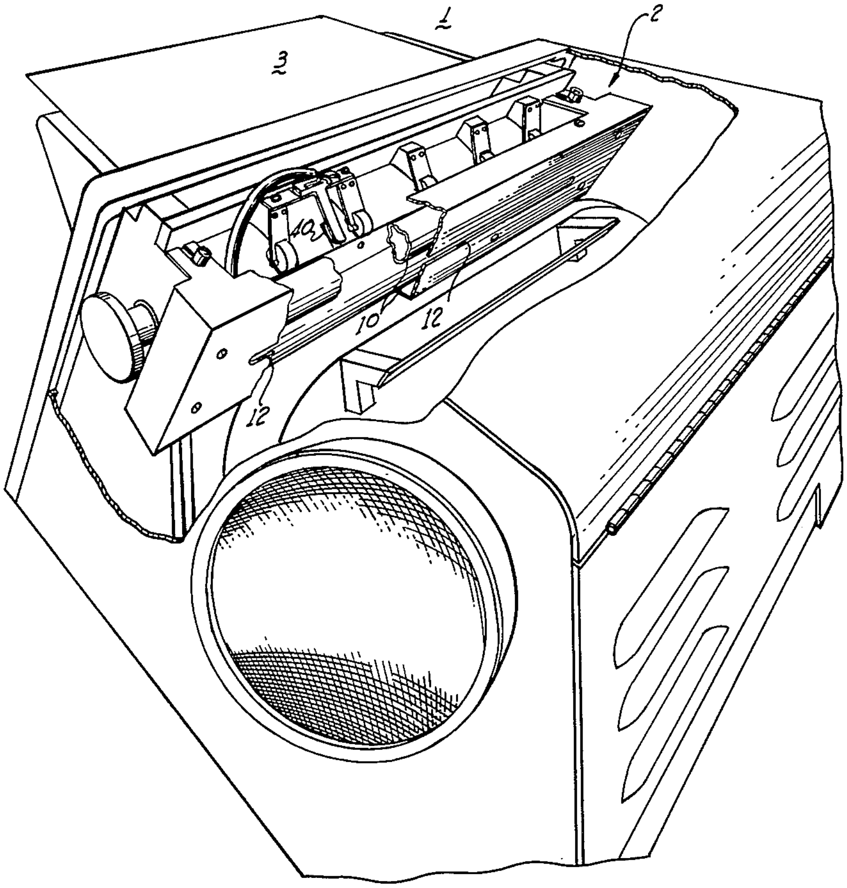

This invention relates to lighting circuits and more particularly to the control of luminescent lamps used in facsimile transmitter equipment for illuminating copy material. Reference is made to U.S. Letters Patents 2,815,397 and 2,967,907 issued to G. M. Stamps, for examples of facsimile transmitters of the type to which this invention may be applied.

Fluorescent lamps, for the most part, are well suited for use in copy scanning applications such as facsimile transmitters because of their relatively uniform brightness along the length of the lamp. This, of course, is important in facsimile transmitters to maintain a uniform standard of fidelity across the whole portion of copy being transmitted. Direct current voltages are used to illuminate the fluorescent lamps in facsimile equipment to eliminate any illumination flicker which would occur if an alternating current source were used.

When direct current power sources are used to energize fluorescent lamps, however, a serious difficulty known as mercury pumping occurs which presents a problem after extensive use of the lamps. When the gas is ionized in the lamp the heavier positive ions have a tendency to drift toward the negatively charged electrode and collect on the structure at that end of the tube. The light uniformity along the length of the tube is thereby lost causing a serious unbalance in illumination of the copy being fed through the scanning portion of the transmitter. This problem is corrected to some degree by using two or more luminescent lamps aligned with one another and having their respective ends connected to opposite polarities of a voltage source. The dark portions of the tubes are hence balanced on both sides of the scanned copy so that the fidelity on both sides of the transmission is approximately equal. However, along the middle portion of the copy the illumination will be greater than at the ends so that there is still some unbalance in fidelity.

It has been found that if the polarity of the direct current power applied to lamps is reversed at frequent intervals the mercury pumping effect can be substantially eliminated and uniform brightness of the lamps substantially maintained.

It is therefore an object to this invention to provide a polarity reversing means for the lamps which are automatically and frequently operated.

It is another object of this invention to provide reversing means for the illuminating lamps in a facsimile transmitter which operate as a function of the number of times the transmitter is used.

More particularly it is an object of this invention to provide polarity reversing means for the lamps of a facsimile transmitting device in which the polarity applied to the lamps is reversed every time a new piece of copy to be scanned is introduced to the transmitter.

It is a feature of this invention to provide a circuit for reversing the polarity of the fluorescent lamps in a facsimile transmitter which is operable responsive to the actuation of a switch by the leading edge of each piece of copy introduced to the transmitter.

It is also a feature of this invention to provide, in combination with the above circuit, means for instantaneously igniting the lamps after every polarity reversal.

Figure 2:
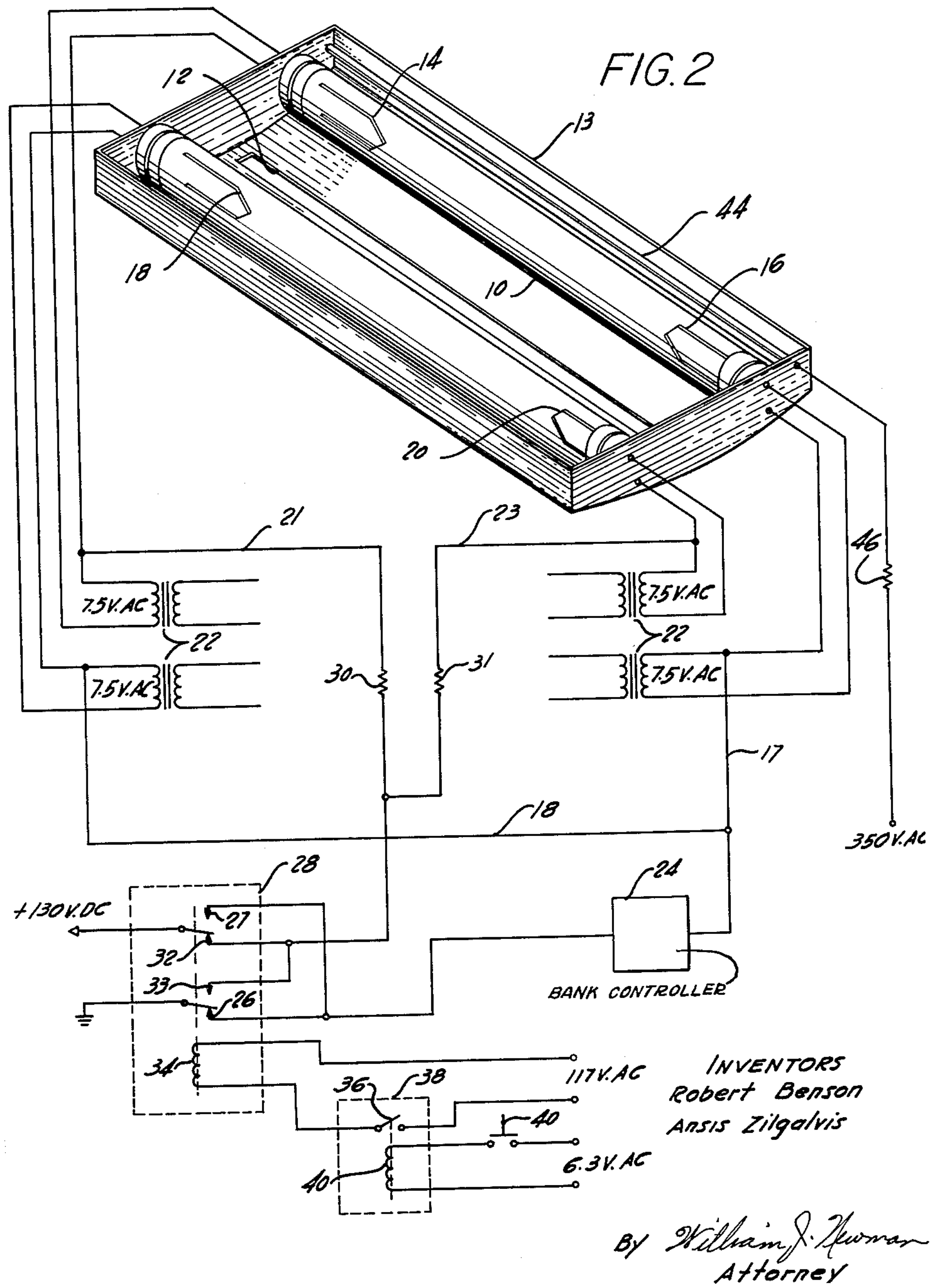

Other objects and features will become apparent upon a further reading of the specification when taken in view of the accompanying drawings in which:

FIG. 1 is an isometric view partially cut away of a facsimile transmitter incorporating the teachings of this invention; and FIG. 2 is a schematic diagram of the lighting circuit including a reversing control to be used in a facsimile transmitter.

The facsimile transmitter 1 of FIG. 1 comprises lighting means 2 for illuminating a sheet of copy 3 being fed through the transmitter. The portion of the copy 3 being illuminated is scanned by appropriate means (not shown) such as disclosed in the aforereferenced patents to G. M. Stamps.

The photocopy illuminating circuit comprises a pair of fluorescent lamps 10 and 12 within an appropriate reflector housing 13. The lamps have respective filaments 14, 16, 18 and 20 which are continuously energized by an alternating current power source (not shown) through filament transformers 22 of any well known type. The filaments 16 through 20 are maintained energized during the transmission cycle of the copy equipment in order to facilitate the instantaneous ignition of the fluorescent lamps after each polarity reversal as hereinafter described.

In order to reduce the effect of any darkening of the ends of the tubes due to mercury pumping the tubes 10 and 12 are aligned in parallel arrangement and have their respective ends connected to opposite polarities of a voltage source in the following manner. The filament 16 of tube 10 and the filament 18 on the opposite end of tube 12 are both connected to a bank controller unit 24 through respective leads 17 and 19. The bank controller 24, the purpose of which will be hereinafter described, is in connection with commonly connected contacts 26 and 27 on a latch-type relay 28. The filaments 14 and 20 of lamps 10 and 12 respectively are connected through leads 21 and 23, and resistors 30 and 31 respectively to a pair of commonly connected contacts 32 and 33 on the latch relay 28. As may be noted the relay 28 is wired as a polarity reversing double pole, double throw switch which is operable to reverse the voltage polarities on the lamps 10 and 12 upon operation thereof. The relay 28 is of the latch type shown in the U.S. Patent 2,531,838 to Arnold H. Bergemann which operates to close one pair of contacts when the relay 34 is energized and prepares to close the other pair of contacts when the relay is deenergized. Each time the relay 28 receives a pulse of current it operates the readied contacts to reverse the polarity to the lamps 10 and 12 and prepares the other contacts to operate with the next pulse of current.

The coil 34 of the reversing relay 28 is energized by a standard alternating current power source through contacts 36 of a relay 38 through an obvious circuit. The winding 40 of relay 38 is connectable across a low voltage alternating current source by means of a copyfeed switch 40 which is mechanically tripped by the leading edge of each piece of copy fed to the transmitter to be scanned. In the preferred embodiment the copyfeed switch 40 is a very sensitive hair spring mechanism which is readily actuable by the leading edge of a piece of paper as is fed to the transmitter. It is to be understood, however, that any mechanical or electronic switch means may be used which will operate responsive to the introduction of a new piece of copy to the device.

The bank controller 24 is included in the lamp circuits to reduce the power drain of the apparatus during standby periods. That is, when copy is not being fed to the transmitter the bank controller automatically removes the power from the lamps as well as other equipment within the transmitter which need not necessarily be energized during the standby condition between copy runs. The bank controller 24 is a timer and switch apparatus of a well known type in the transmitter art, which turns off the power to the unnecessary equipment a predetermined time after the transmission of the last copy is completed. The next piece of copy fed to the machine operates the bank controller to restore power to the necessary equipment for the next transmission.

Special provisions have been made in the tube lighting circuit to insure instantaneous ignition of the lamps 10 and 12 after each reversal of the power to the lamps.

An electrode 44 is positioned within the housing 13 in the proximity of the tubes 10 and 12 and is connected through a current limiting resistor 46, to a relatively high voltage A.C. source. The electrode 44 is fully insulated from neighboring parts of the transmission equipment so that there is no appreciable leakage therebetween. The alternating voltage on the electrode 44 establishes a fluctuating electrostatic field in and around the two fluorescent lamps 10 and 12 which maintains them in a condition to be readily ionized after each polarity reversal. As hereinbefore mentioned the filaments 14, 16, 18 and 20 are also maintained in an energizing condition to facilitate the ready ignition of the lamps.

In describing the operation of the circuit it will be first assumed that the tube filaments 14, 16, 18 and 20 are all being energized by a heating current, that the starting electrode 44 is connected to an operating A.C. voltage source and that in the last operation of the latch relay 28 the latch mechanism prepared the contacts 27 and 33 for closure the next time coil 34 is energized. The next piece of copy fed to the transmitter will close the copyfeed switch 40 to operate relay 38 and complete the circuit for energizing coil 34 of the latch relay 28 through the normally open contacts 36. The prepared contacts 27 and 33 will close to place a positive ionizing voltage through contact 27 on the right end of tube 10 and on the left end of tube 12. The left end of tube 10 and right end of tube 12 are connected to the ground through the bank controller 24 and the latch relay contacts 33. As the trailing edge of the scanned copy passes the copy feed switch 40, it releases and, thereby, deenergizes the coil 34 of the latch relay 28. As it is deenergized the latch mechanism is operated to prepare contacts 26 and 32 for closure the next time copyfeed switch 40 is operated. The next piece of copy fed to the transmitter will again operate the copy feed switch 40 to effect the energization of coil 34 and close the contacts 26 and 32 of the latch relay 28. The positive voltage will now be applied to the left end of tube 10 and right end of tube 12 through the bank controller 24 with ground being applied to the right end of tube 10 and left end of tube 12 through the respective resistors 30 and 31.

It may be seen that there is provided in this invention an effective means for reducing the effects of ion pumping in luminescent lamps for photocopying devices such as facsimile transmitters. While there has been shown only one preferred embodiment of a device accomplishing the objects and advantages of this invention it will be understood that many modifications may be made thereto which, although are not described in detail above, would readily come within the spirit and intention of this invention. It is therefore intended that this invention be limited only by the scope of the appending claims.

What is claimed is:

1. Apparatus for illuminating copy in a facsimile transmitter comprising an even plurality of luminescent lamps, a direct current power source, a reversing switch in connection between said lamps and said power source, said reversing switch operable to reverse the polarity of power to said lamps, a copy-feed switch actuatable by the leading edge of each piece of copy fed to the facsimile transmitter, a relay operable responsive to said copy-feed switch for operating said reversing switch, and means including a fluctuating electrostatic field for instantaneously igniting said lamps after each operation of said reversing switch.

2. Apparatus for illuminating copy in a facsimile transmitter comprising an even plurality of luminescent light means, a direct current power source, a reversing switch in connection between said light means and said power source and operable to reverse the polarity of power to said light means, a copy-feed switch actuatable by each piece of copy fed to the facsimile transmitter, means operable responsive to said copy-feed switch for operating said reversing switch, and means for instantaneously igniting said light means after each operation of said reversing switch.

3. Apparatus for illuminating copy in a facsimile transmitter comprising an even plurality of fluorescent lamps positionally arranged in parallel alignment and each having its ends electrically connected to the opposite end of its adjacent lamps, a direct current power source, a reversing switch in connection between said power source and said fluorescent lamps, said reversing switch operable to reverse the polarity of power to said fluorescent lamps, a copyfeed switch actuatable by the leading edge of each piece of copy fed to the facsimile transmitter, a relay operable responsive to said copy-feed switch for operating said reversing switch, and means for instantaneously igniting said lamps after each operation of said reversing switch, said igniting means comprising a high voltage electrode aligned with and adjacent to said lamps.

4. Apparatus for illuminating copy in a facsimile transmitter comprising a pair of fluorescent lamps positionally arranged in parallel alignment transverse to the path of travel of the copy and each having constantly energized filaments at either end, each lamp having its ends electrically connected to the opposite ends of the other lamp, a direct current power source, a first relay having double pole, double throw contacts in connection between said power source and said fluorescent lamps, said contacts being operable to reverse the polarity of power to said fluorescent lamps, a copy-feed switch actuatable by the leading edge of each piece of copy fed to the facsimile transmitter, a second relay operable responsive to said copy-feed switch for energizing said first relay to actuate said contacts, an insulated electrode adjacent to and extending the length of said fluorescent lamps and a fluctuating high voltage source connected to said electrode.

5. For use with a facsimile transmitter, apparatus for illuminating copy to be transmitted thereby comprising an even plurality of luminescent light means, a reversing switch in connection with said light means and said power source and operable to reverse the polarity of power to said light means, means including a switch actuatable by each piece of copy fed to the facsimile transmitter for operating said reversing switch, and means for causing instantaneous ignition of said light means after each operation of said reversing switch.

References Cited by the Examiner

UNITED STATES PATENTS 2,792,448 5/57 Deuth et al. ............ 178—7.6

FOREIGN PATENTS 119,358 12/44 Sweden.

GEORGE N. WESTBY, *Primary Examiner.*

RALPH G. NILSON, *Examiner.*